United States Patent [19]

Wright et al.

[11] Patent Number: 5,001,842

[45] Date of Patent: Mar. 26, 1991

[54] ERROR DETERMINATION FOR MULTI-AXIS APPARATUS DUE TO THERMAL DISTORTION

[75] Inventors: David A. Wright; Alexander T. Sutherland, both of Edinburgh, Scotland

[73] Assignee: Ferranti International plc, Cheshire, England

[21] Appl. No.: 463,140

[22] Filed: Jan. 10, 1990

[30] Foreign Application Priority Data

Jan. 28, 1989 [GB] United Kingdom ............... 8901939

[51] Int. Cl.[5] ............................................... G01K 13/00
[52] U.S. Cl. ..................................... 33/702; 33/503; 374/141; 374/142; 374/179
[58] Field of Search ................. 33/702, 704, DIG. 19, 33/502–504; 374/141, 142, 179, 137, 138, 12

[56] References Cited

U.S. PATENT DOCUMENTS

| | | | |
|---|---|---|---|
| 1,985,967 | 1/1935 | Wunsch | 374/141 |
| 2,015,838 | 10/1935 | Borden et al. | 374/179 |
| 3,053,091 | 11/1962 | Braunagel | 374/179 |
| 3,218,859 | 11/1965 | McBride et al. | 374/179 |
| 4,483,631 | 11/1984 | Kydd | 374/141 |
| 4,490,053 | 12/1984 | Coston et al. | 374/179 |
| 4,815,213 | 3/1989 | McCabe et al. | 33/702 |

FOREIGN PATENT DOCUMENTS

| | | | |
|---|---|---|---|
| 8802096 | 3/1988 | Fed. Rep. of Germany | 33/702 |
| 958004 | 5/1964 | United Kingdom . | |
| 1195110 | 6/1970 | United Kingdom | 374/141 |
| 1213595 | 11/1970 | United Kingdom . | |
| 2037431 | 11/1978 | United Kingdom . | |

*Primary Examiner*—William A. Cuchlinski, Jr.
*Assistant Examiner*—Alvin Wirthlin
*Attorney, Agent, or Firm*—Kerkam, Stowell, Kondracki & Clarke

[57] ABSTRACT

Apparatus with a multi-axis mechanism to perform, say, measurements or tests, has at least one pair of temperature detectors individually for each of selected members of the mechanism, each pair of temperature detectors being arranged to sense temperature differences transversely across the associated member. The required positions of the temperature detectors are predetermined from a preliminary examination of the mechanism, so that the extent and direction of each predetermined aspect of thermal distortion within the mechanism, can be computed from simultaneously detected transverse temperature differences, employing algorithms devised as a result of the preliminary examination of the mechanism. Compensation for corresponding selected errors in the measurements or tests can be calculated from the computed extent and direction of each of the predetermined aspects of thermal distortion within the mechanism.

12 Claims, 2 Drawing Sheets

ERROR DETERMINATION FOR MULTI-AXIS APPARATUS DUE TO THERMAL DISTORTION

This invention relates to apparatus with a mechanism, within which are to be performed movements, possibly including performing also measurements or tests, in relation to a plurality of axes associated with the mechanism, the apparatus having means whereby selected errors in the movements or, possibly, in the measurements or tests, may be calculated.

It is known to calculate errors in movements due to geometric or mechanical errors of known magnitudes within the mechanism. Conveniently, a geometric error map is calculated in this respect and such a map possibly is stored within a computer included in the apparatus. The geometric error map may comprise either a two-dimensional array or a three-dimensional matrix of points, at each of which points the relevant errors in movements have been calculated. It can be considered that the algorithms by which the errors are calculated are embodied in the geometric error map. The calculation of errors from known geometric errors within the mechanism is an operation without difficulty and it is immaterial whether a provided error map is in relation to the errors in the movements or to the corresponding geometric errors within the mechanism.

It is desirable also to calculate errors within the mechanism due to significant aspects of thermal distortion within the mechanism.

It is usually required that, say, a measurement or test is performed at a reference temperature of, say, 20° C. It is known for the mechanism to be positioned in a controlled and monitored enclosure, so that the reference temperature is uniformly present throughout the enclosure whilst the desired measurement or test is being made. However, it is difficult to provide the required extent of control of temperature throughout such an enclosure; and any workpiece to be measured or tested may cause temperature gradients within the enclosure which are difficult to remove, and/or which temperature gradients occur only transiently whilst the measurement or test is being made and are difficult to detect. Therefore it is desirable to obviate the need to provide a temperature controlled enclosure.

A constant rate of change of temperature from the reference temperature, uniformly throughout the mechanism, causes changes in length along the longitudinal axes of constituent members of the mechanism. The extent and direction of each such change in length of the members can be computed easily by suitable means provided for this purpose within the apparatus and from appropriate simultaneously detected temperatures within the mechanism. The corresponding errors in the movements can be calculated easily from the thus computed changes in lengths of the members, also by suitable means provided for this purpose within the apparatus, conveniently, such means also comprising the means to compute the changes in lengths of any measuring scales included in the mechanism.

However, it is conventional not to attempt to determine the extent and direction of any relevant aspect of thermal distortion within the mechanism due to temperature differences transversely across constituent members of the mechanism, such relevant aspects of thermal distortion being capable of causing significant errors in movements. For a mechanism with six degrees of freedom there are relevant aspects of thermal distortion in relation, possibly, to three instantaneous translational, and to three instantaneous rotational, possible displacements associated with any point within the mechanism.

It is an object of the present invention to provide apparatus with a mechanism to perform movements, including possibly also performing measurements or tests, in relation to a plurality of axes associated with the mechanism, and having suitable means whereby the extent and direction of each predetermined relevant aspect of thermal distortion within the mechanism due to temperature differences occurring transversely across constituent members of the mechanism can be computed, so that compensation for corresponding selected errors in the movements can be calculated, conveniently, by said means to compute, and from the extent and direction of each predetermined aspect of thermal distortion within the mechanism, computed by said means to compute.

According to the present invention apparatus with a mechanism to perform movements in relation to a plurality of axes associated with the mechanism, has means to compute the extent and direction of each predetermined aspect of thermal distortion capable of occurring within the mechanism due to temperature differences transversely across each of a selected plurality of constituent members of the mechanism, said means including at least one pair of temperature detectors provided individually for each of the selected plurality of members, each pair of temperature detectors being arranged to sense differences in temperature in relation either to a sole appropriate transverse direction or to one of two appropriate transverse directions at right angles to each other across the associated member.

It has been found that the extent and direction of each relevant predetermined aspect of thermal distortion within the mechanism can be computed merely by detecting temperature differences transversely across only selected members of the mechanism, and at only a few positions within the mechanism. Especially this is possible if the mechanism has been designed kinematically, so that the forms of inevitable distortions within the mechanism are, at least substantially, predetermined.

At least one of the relevant aspects of thermal distortion, and the corresponding required positions of the temperature detectors, are predetermined from a preliminary examination of the mechanism, and the extent and direction of each predetermined relevant aspects of thermal distortion within the mechanism can be computed from simultaneously detected transverse temperature differences, employing algorithms devised as a result of the preliminary examination of the mechanism. Compensation for corresponding selected errors in the movements, including possibly also compensation for any measurements, or tests; also can be calculated conveniently by the means to compute, and from the extent and direction of each predetermined aspect of thermal distortion within the mechanism computed by said means to compute.

At least one algorithm, devised in relation to the computation of the extent, and direction of each predetermined aspects of thermal distortion within the mechanism, may be determined in an empirical manner.

In respect of errors due to thermal distortion within the mechanism, it is not necessary to consider a datum point for the thermal distortion but merely to consider changes in the extent and direction of each predetermined aspect of the thermal distortion caused by detected changes in temperature differences transversely across each of a selected plurality of constituent members of the mechanism.

Usually there are at least three selected members within the mechanism; at least one of which selected members may comprise a beam member.

The mechanism, when comprising a measuring, or testing, mechanism, may include a work table on which a work piece to be measured or tested is to be positioned, a bridge having a beam mounted at its ends on pillars and spanning the work table, the bridge being free to move relative to the work table, a probe carrier mounted on the bridge beam and being free to move along the bridge beam, and a probe tip at the end of a column, the column being supported by the probe carrier and being free to move along its longitudinal axis relative to the probe carrier, said plurality of selected members within the mechanism including one pillar for the bridge beam, the bridge beam, and the column having the probe tip at one end.

The temperature detectors may have any convenient form.

Conveniently, the temperature detectors comprise electrical temperature detectors.

Only a single pair of temperature detectors may be required to detect a temperature difference in relation to a transverse direction across a selected member.

Alternatively, the thermal distortion likely to occur within the mechanism is such that there is required to be a plurality of pairs of temperature detectors in relation to a transverse direction across at least one selected member, the plurality of pairs of temperature detectors being spaced from each other along the longitudinal axis of the member. The plurality of pairs of temperature detectors may be connected in series. When these temperature detectors comprise electrical temperature detectors, they provide an enhanced electrical signal representative of the mean, along the longitudinal axis of the member, of temperature differences in relation to said transverse direction across the member. Otherwise, the arrangement is such that there is to be detected any temperature differences, in relation to said transverse direction across the member, individually for a plurality of constituent sections of the member, the sections being distributed along the longitudinal axis of the member.

Conveniently, at least one of the selected members of the mechanism may comprise a beam member having a hollow form of construction, for example having a box construction with a rectangular or square shaped section, and each associated pair of temperature detectors is positioned within the hollow beam member, when the temperature detectors comprise electrical temperature detectors, leads from the temperature detectors extending along the longitudinal axis of the beam member, to be external of the beam member.

Each pair of temperature detectors is connected differentially so as to detect any difference in temperature in relation to a transverse direction across the associated member. Thus at least one pair of temperature detectors, comprising electrical temperature detectors, may comprise a pair of thermocouples arranged back-to-back, a length of one thermocouple material extending between the two junctions and two leads of the other thermocouple material extending individually from the two junctions.

If the error due to thermal distortion within the mechanism is likely to vary with time, it is desirable to calculate the error for at least what can be considered to be the instantaneously computed extent and direction of the predetermined aspects of the thermal distortion of the mechanism, in real time. Thus, the error may be calculated after each movement by the mechanism, or after each detection of a significant change of a relevant transverse temperature difference within the mechanism.

Alternatively, calculation of the errors due to thermal distortions within the mechanism in relation to a series of movements, may be made periodically, whilst the series of movements is being performed.

Conveniently, errors within the mechanism, comprising the extent and direction of each predetermined aspect of thermal distortion within the mechanism, and computed in accordance with the present invention, or corresponding derived errors in movements calculated from the computed errors due to thermal distortion within the mechanism, can be included within an active error map, possibly stored within a computer included in the apparatus. Such an active error map can be considered as representing the algorithms devised as a result of the preliminary examination of the mechanism and referred to above in relation to the computation of the extent and direction of each predetermined aspect of thermal distortion within the mechanism, in accordance with the present invention.

Advantageously, computed errors within the mechanism, comprising the extent and direction of each predetermined aspect of thermal distortion within the mechanism, or corresponding derived errors in movements calculated from the computed errors due to thermal distortion within the mechanism, can be superimposed on a known geometric error map, possibly stored within a computer included in the apparatus. Hence, it can be considered that the algorithms devised as a result of the preliminary examination of the mechanism are superimposed on the algorithms considered as being embodied in a known geometric error map.

The present invention will now be described by way of example with reference to the accompanying drawings, in which:

FIG. 1 is a perspective view of part of apparatus including a mechanism comprising a known co-ordinate measuring machine, which apparatus is capable of being modified so that, in accordance with the present invention, a constituent part of probe tip location error determining means of the apparatus, not shown in FIG. 1, can be arranged to determine errors due to temperature differences transversely across selected constituent members of the mechanism, FIG. 2 is a diagrammatic view of a beam member of the mechanism comprising a box construction square section constituent member, and indicates how any temperature difference between either pair of opposing surfaces of the beam member is detected.

Figure 1:
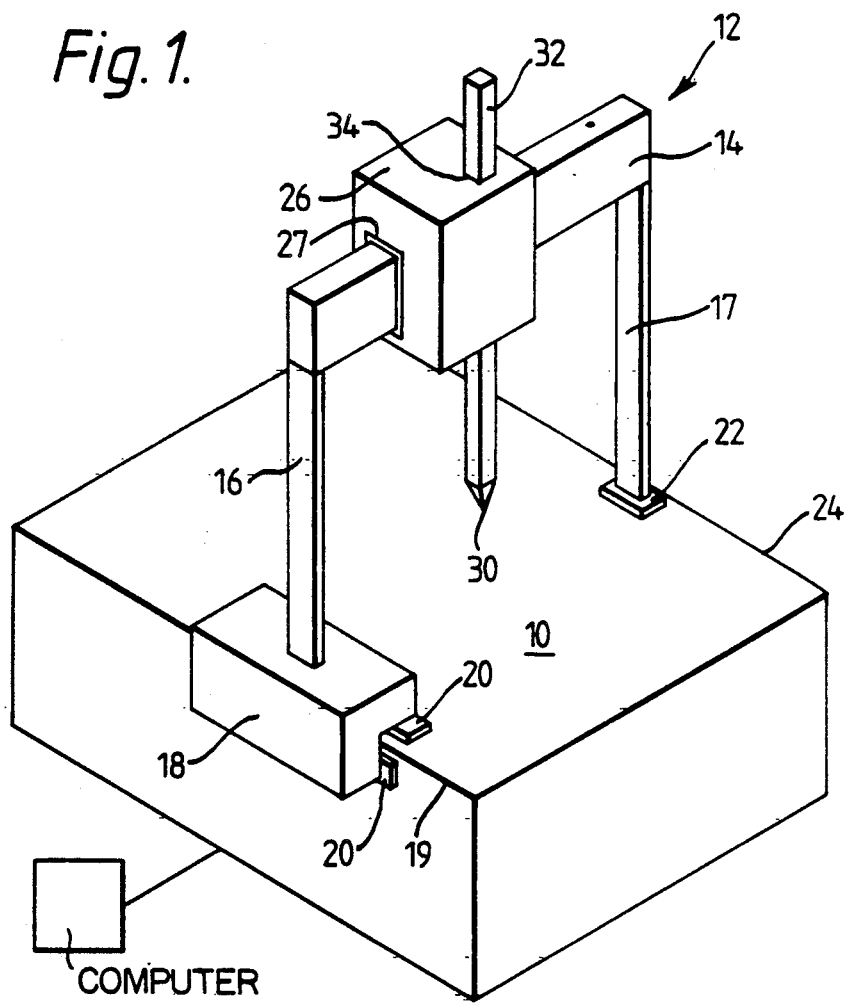

Apparatus to which the present invention relates includes a mechanism, comprising a known co-ordinate measuring machine shown in FIG. 1, there to be movements within the mechanism, the mechanism having a horizontal work table 10, rectangular shaped in plan and on which work table a workpiece, not shown, and to be measured, is supported. The mechanism also has a probe. Measurements are made in respect of the workpiece by the probe tip being placed in contact with different locations on the surface of the workpiece.

The part of the probe-bearing mechanism mounted on the table 10 includes a bridge 12, spanning the table and comprising a horizontal beam 14, supported at either end by vertical pillars 16 and 17. The lower end of one pillar 16 is integral with a member 18 having an 'L' shape in section and is adapted to be displaced along an adjacent edge 19 of the table 10. In particular, the re-entrant part of the 'L'-section member 18 co-operates with the table edge 19. Air bearings, indicated at 20, are secured to the re-entrant part of the member 18 and ensure that there is correct guidance of the bridge 12 over the table 10. The lower end of the other pillar 17 is supported on an air bearing 22, adjacent to the edge 24 of the table.

Mounted on the horizontal beam 14 of the bridge 12 is a probe carrier 26. The beam 14 passes through a horizontally extending aperture 27 in the probe carrier 26 and the probe carrier is supported on the beam with air bearings, not shown, therebetween. Thus, the probe carrier 26 can move freely along the longitudinal axis of the beam 14.

A probe tip 30 is at the lower end of a square-section, vertically extending column 32. The column 32 is supported by the probe carrier 26 in a vertically extending aperture 34 in the probe carrier, the aperture being displaced laterally on one side of the horizontal beam 14. Air bearings, not shown, are provided between the column and the probe carrier 26. The column 32 can move freely within the aperture 34, under the control of an actuator, also not shown. Thus, there are three axes associated with the mechanism comprising the co-ordinate measuring machine.

The probe tip 30 has three instantaneous rotational, and three instantaneous translational, possible displacements due to thermal distortion within the mechanism, because of temperature differences within the mechanism. If any such displacement or relevant aspect of the thermal distortion is significant, it is desirable that its magnitude is determined, and thus the apparatus is required to have means to compute errors in probe tip locations due to this aspect of the thermal distortion of the mechanism.

Changes along the longitudinal axes of constituent members of the mechanism due to a constant rate of change of temperature from a reference temperature uniformly throughout the mechanism, easily can be calculated. Corresponding errors in the location of the probe tip easily can be calculated and suitable means to make such calculations may be included in the apparatus. The manner of making such calculations of probe tip location errors is not described.

It is more difficult to calculate the extent and direction of each significant predetermined aspect of distortion within the mechanism due to temperature differences transversely across constituent members of the mechanism and to compute the corresponding errors in the location of the probe tip 30. In accordance with the present invention, it is required that means be provided in the apparatus to calculate probe tip location errors caused by temperature differences transversely across selected constituent members of the mechanism.

Surprisingly, it has been found that probe tip location errors can be determined by detecting, temperature differences at only a few positions transversely across selected members of the mechanism and possibly at only one such position. It is then possible to calculate for the, or each such position, at least the extent and direction of each corresponding predetermined aspect of the distortion of the mechanism. Especially this is possible if the mechanism has been designed kinematically so that the forms of inevitable distortions within the mechanism are, at least substantially, predetermined. The required positions of the temperature detectors are determined from a preliminary examination of the mechanism.

From an examination of the illustrated mechanism, other than the work table 10, it is possible to determine that transverse temperature differences across only three constituent members result in significant probe tip location errors. These three members comprise the pillar 16 of the bridge 12, the horizontal beam member 14 of the bridge 12, and the beam member comprising the probe column 32.

Transverse temperature differences across the pillar 17 of the bridge 12 do not cause significant probe tip location errors.

Each of the selected members 14, 16 and 32 is either rectangular or square shaped in section, having two pairs of opposing surfaces. Any temperature difference between one or both pairs of opposing surfaces of the selected members may be detected, so as to detect any temperature difference in relation to two transverse directions at right angles to each other, across each selected member, 14, 16 and 32.

Initially, it will be considered that it is only necessary to determine any temperature difference in relation to each appropriate transverse direction across a selected member, between a pair of opposing surfaces, by detecting any temperature difference at only one point along the longitudinal axis of the member. For the pillar 16 it is desirable to detect any horizontal temperature difference in relation to the two transverse directions at right angles, and at a transverse plane of the member spaced along the length of the pillar from the 'L'-section member 18. For the probe column 32 it is desirable to detect any horizontal temperature difference in relation to the two transverse directions at right angles, and at a transverse plane of the beam member spaced along the length of the column from the probe carrier 26. For the horizontal beam member 14 it is desirable to detect any horizontal transverse temperature difference at a transverse plane of the beam member spaced along the length of the beam member from the pillar 16, and to detect any vertical transverse temperature difference at the mid transverse plane of the beam member.

If a temperature difference does occur in relation to an appropriate transverse direction across any of the selected members 14, 16 and 32 between one opposing pair of surfaces of the member it is also considered that the member distorts to bend into a uniformly circular arc. The distortion is in a plane at right angles to the opposing pair of surfaces. This plane includes both the longitudinal axis of the member and the appropriate transverse direction across the member. The greater the temperature difference the smaller is the radius of curvature of the arc of the member in this plane.

It is convenient to consider distortion of each of the three selected members and in relation to each of the two opposing pairs of surfaces individually, and to calculate the extent of the distortion of the member individually in each of the two planes including the two appropriate transverse directions at right angles to each other.

Thus, in accordance with the present invention for the illustrated co-ordinate measuring machine, it is required to have pairs of temperature detectors arranged to detect any temperature difference between the relevant pairs of opposing surfaces referred to above. Conveniently, but not essentially, the temperature detectors comprise electrical temperature detectors.

Figure 2:
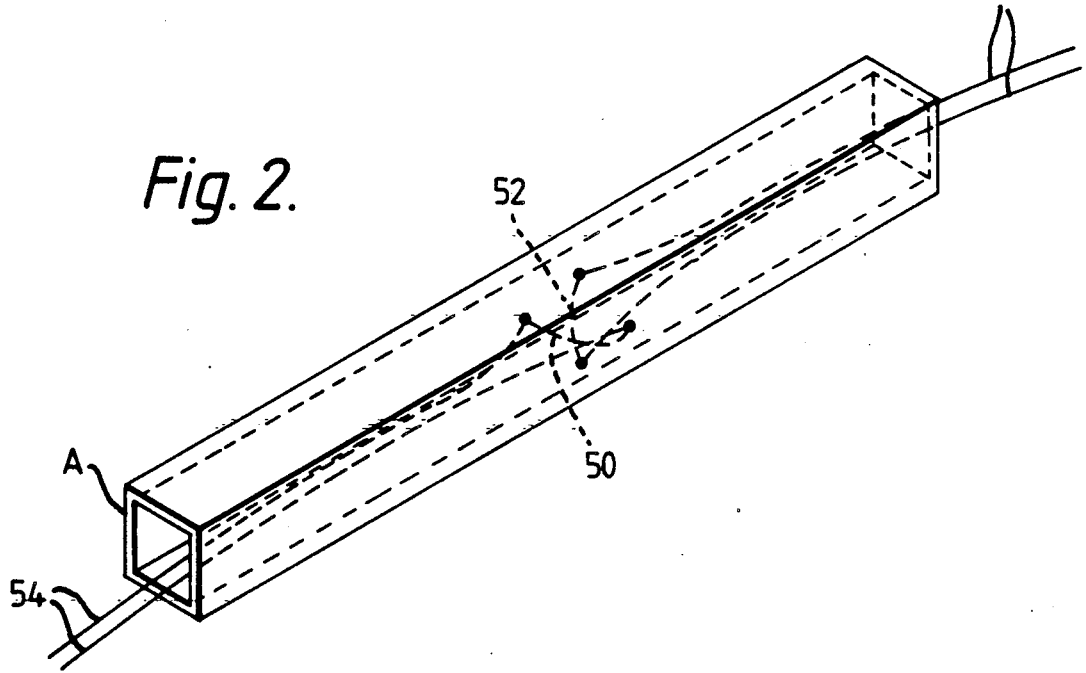
Figure 3:
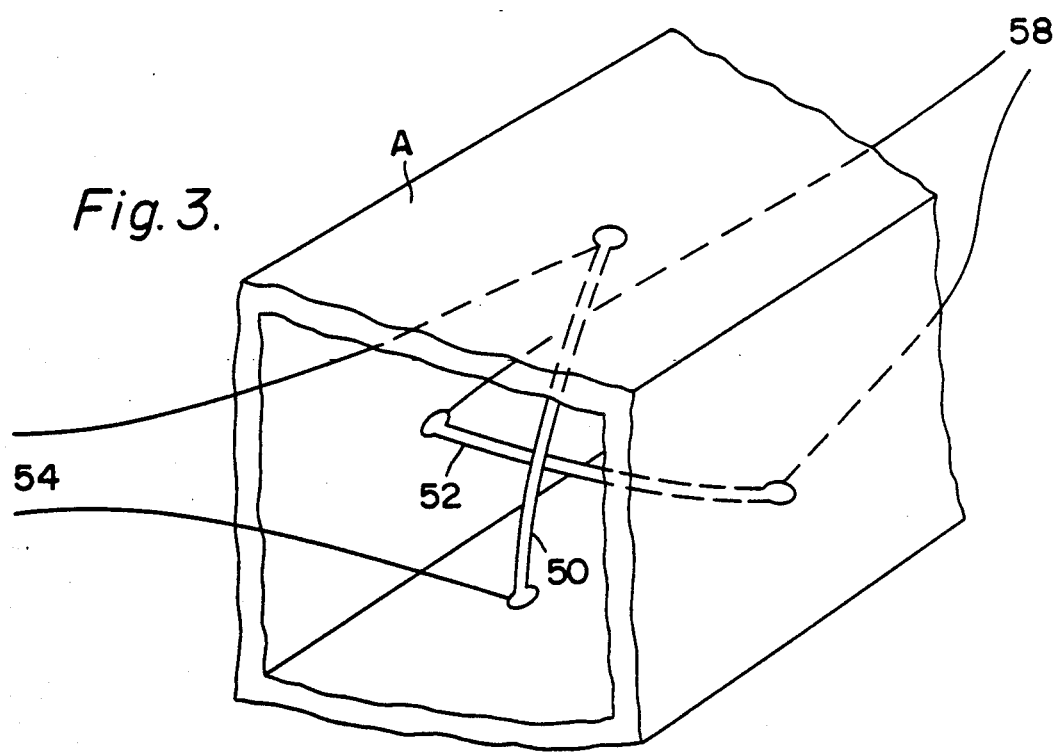
FIG. 3 is an enlarged view of FIG. 2.

Also conveniently, but not essentially, the selected beam members 14 and 32 each has a box construction, as shown at 'A' in FIG. 2. Each such beam member has rigidity. Further, the box construction for a selected beam member enables pairs of electrical temperature detectors to be housed within the beam member whilst detecting differences between the temperatures of both opposing pairs of surfaces of the beam member at the desired transverse plane or planes of the beam member. However, it is immaterial whether the temperatures of the internal or the external surfaces of the box construction are detected.

The electrical temperature detectors may have any suitable form, and are required to be connected differentially, to determine any difference in temperature between an opposing pair of surfaces of a selected member 14, 16 and 32. As shown for the box construction beam member A of FIG. 2, a pair of temperature detectors comprises a pair of thermocouples arranged back-to-back, with the cold junctions eliminated. Hence calibration of the pair of thermocouples is simplified. As shown in FIG. 2, a short length 50, or 52, of the expensive thermocouple material, such as constantan, extends between junctions on the opposing pairs of interior surfaces of the beam member A. Each pair of thermocouples is completed by two long leads, respectively 54 and 56, of the other thermocouple material, such as copper, extending from the two junctions on the opposing pairs of surfaces of the beam member. The pairs of leads 54 and 56, extend along the interior of the box construction beam member A, to be external of the beam member. Because the thermocouples are connected differentially certain errors in the thermocouples cancel out, because the thermocouples measure temperature differences, and not absolute temperatures. If the co-ordinate measuring machine is calibrated with the thermocouples active, only changes in thermocouple pair differences are relevant, further reducing the requirements for thermocouple accuracy.

Further, from the preliminary examination of the illustrated mechanism it can be determined that it is required also to detect any transverse temperature differences for three parts within the work table 10. Thus the extents and directions of the corresponding aspects of thermal distortion in the work table can be determined individually, and corresponding probe tip location errors can be calculated.

Advantageously, the work table 10 comprises a granite block. However, it is necessary to consider the extents and directions of the predetermined aspects of the thermal distortion of the work table 10 in relation to selected transverse directions thereof. In particular, it is required to consider that the granite work table 10 comprises an apparent first vertical member, extending longitudinally substantially at right angles to the bridge beam 16 and under the bearing 20, an apparent second vertical member, extending longitudinally, substantially at right angles to the bridge beam 16 and under the bearing 22, and superimposed on the first member, an apparent third horizontal member, extending longitudinally substantially at right angles to the bridge beam 16 and extending laterally across the table. Thus, it is required to detect any transverse temperature difference at the mid horizontal transverse plane of the apparent third member at the mid vertical transverse plane of the apparent first member, and at the mid vertical transverse plane of the apparent second member.

Irrespective of whether the temperature detectors comprise electrical temperature detectors or not, and irrespective of whether at least one of the selected real or apparent members of the mechanism comprises, or can be considered as comprising, a hollow beam member or not, the temperature detectors may be applied to external surfaces of the real selected members, or apparent selected members. The sensing part of each such temperature detector may be within the associated selected member, spaced from the surface thereof. For any such arrangement it is required that any portion of the sensing part of the temperature detector protruding from the member surface is thermally insulated. It is possible that with such arrangements, the temperature detectors respond undesirably rapidly to any changes of the temperature gradients across the selected members. Hence it is required that there is a delay to be provided, in any convenient manner, before any signals representative of detected changes of the temperature gradients across the selected real or apparent members are operated upon in the apparatus in accordance with the present invention.

Electrical temperature detectors are advantageous because electrical signals occurring on the leads from any co-operating pair of electrical temperature detectors are representative of any detected relevant temperature difference within the probe-bearing mechanism.

Analogue signals provided by the pairs of electrical temperature detectors are supplied to at least one analogue-to-digital converter, the output of which converter, in the form of corresponding digital signals, is supplied to a known form of microprocessor, say the Z80 microprocessor manufactured by Zilog, Inc., and arranged to operate upon digital signals.

The microprocessor is programmed in accordance with predetermined algorithms, such that in response to the receipt of electrical signals from the pairs of temperature detectors the microprocessor is arranged to determine individually the possible extents and directions of predetermined aspects of thermal distortion of the mechanism caused by the detected temperature differences.

Further, the microprocessor is also programmed to provide an output from which the instantaneous, corresponding probe tip location errors can be calculated.

The probe tip location errors may be determined at any convenient time after required probe tip location measurements have been made. Alternatively, real time determinations of probe tip location errors are required if the co-ordinate measuring machine is operating in a closed loop mode, such as when the machine is arranged to scan continuously with an analogue probe.

The determination of the directions and the extents of the predetermined aspects of thermal distortion within the mechanism may be made by the microprocessor either periodically or in relation to each measurement to be performed by the apparatus. If made periodically the determination of the directions and the extents of the predetermined aspects of the thermal distortion may be made after each detection of a significant change of a relevant transverse temperature difference within the probe-bearing mechanism. In such a case, and also in the case when the determinations in respect of the predetermined aspects of the thermal distortion are made in relation to each measurement, the instantaneously detected probe tip location is employed directly in the calculation of the probe tip location errors. Thus the microprocessor at least, can be considered as operating in real time in relation to at least what can be considered to be the instantaneously determined directions and extents of the predetermined aspects of thermal distortion of the probe-bearing mechanism.

Alternatively, the determinations in respect of the predetermined aspects of the thermal distortion of the probe-bearing mechanism may be made periodically and irrespective of any significant change of a relevant transverse temperature difference within the probe-bearing mechanism. In such a case the instantaneously detected probe tip location is not employed directly in the calculation of the instantaneous probe tip location errors. In order that the microprocessor can be considered as operating in real time in relation to each determination by the microprocessor of the directions and extents of the predetermined aspects of thermal distortion of the probe-bearing mechanism, there is stored in the microprocessor a map of probe tip location errors. The error map is in relation to a plurality of discrete probe tip locations, in a two-dimensional array or a three-dimensional matrix, of such probe tip locations. Such an error map may be represented by an output of the microprocessor, from which microprocessor output errors in the probe tip location are determined when, subsequently, probe tip locations are detected. Alternatively, the arrangement may be such that the error map is stored in the microprocessor and this stored information is operated upon, in combination with information of each subsequently detected probe tip location. In response to such an operation the microprocessor is arranged to provide an output either representative of the probe tip location errors for the then instantaneously detected probe tip location, or representative of the corrected probe tip location.

In any arrangement in which an error map is generated, the error map is considered to be active, the algorithms capable of being considered as being embodied in the map also being capable of being employed to determine the instantaneous probe tip location errors.

Errors in the measurements made by the mechanism and due to geometric or mechanical errors within the mechanism, and of known magnitudes can be calculated, and it is known to calculate an active error map in this respect. The active geometric error map may conveniently be stored within a microprocessor included in the apparatus, and may be in respect of the errors within the mechanism or the corresponding errors in the measurements.

Advantageously, computed errors within the mechanism due to the predetermined aspects of thermal distortion or corresponding errors in the measurements calculated therefrom, can be incorporated in an active error map of known geometric or mechanical errors within the mechanism, or of corresponding errors in the measurements calculated therefrom. Hence it can be considered that the algorithms devised as a result of the preliminary examination of the mechanism and in relation to the predetermined aspects of thermal distortion, are superimposed on the algorithms considered as being embodied in the active error map of known geometric, or mechanical, errors within the mechanism.

The arrangement may be such that at least one of the selected members does not distort, at least solely, to bend into a uniformly circular arc in a plane including both an appropriate transverse direction across the member and the longitudinal axis of the member. Thus it is necessary to calculate the form of the distortion in addition to the extent of the distortion, and the algorithms in accordance with which the microprocessor is programmed are required to be such that the additional calculation is performed.

At least one algorithm, in accordance with which the microprocessor is programmed, may be determined wholly empirically.

Figure 4:
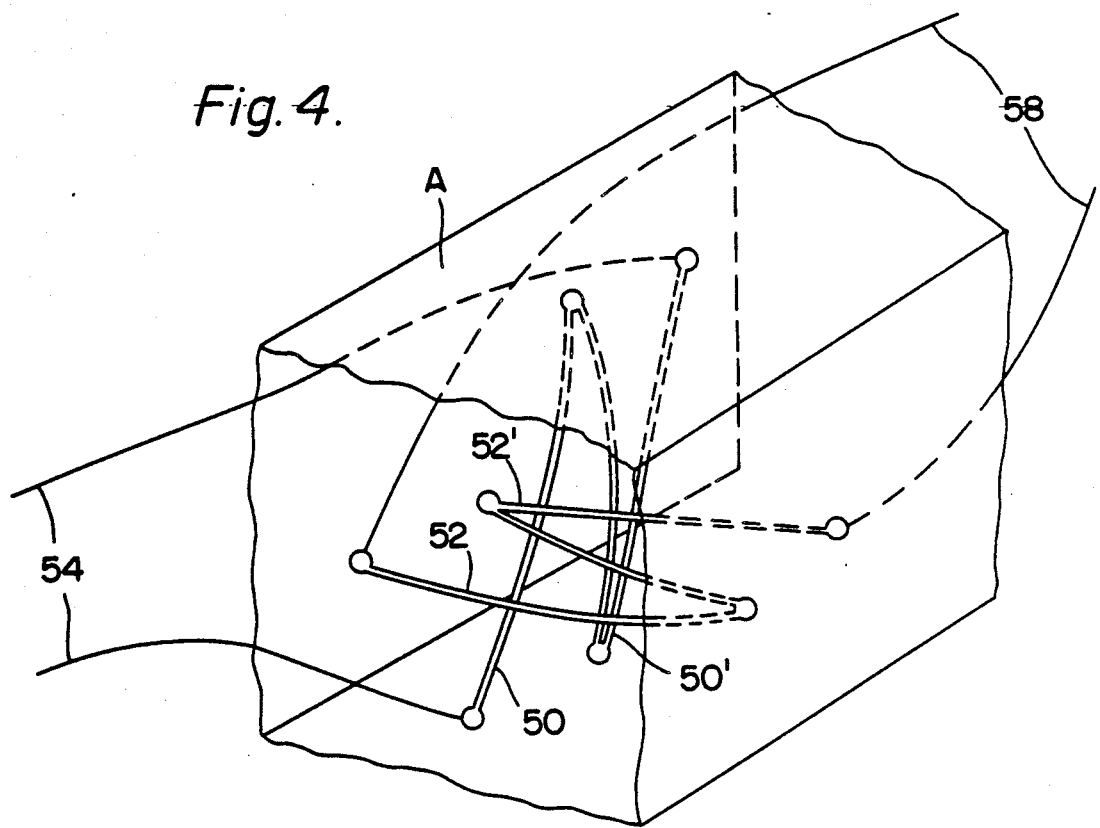
FIG. 4 is a view similar to FIG. 3 showing a plurality of pairs of sensors in accordance with the invention.

Possibly for this reason, or otherwise, instead of a single pair of temperature detectors to detect any temperature difference between an opposing pair of surfaces of a selected member in relation to an appropriate transverse direction across the member, a plurality of pairs of temperature detectors 50, 50' and 52, 52' as shown in FIG. 4 may be provided, distributed along the longitudinal axis of the member.

Particularly if the form of the distortion of a selected member in a plane including an appropriate transverse direction across the member is to be calculated, the plurality of pairs of temperature detectors distributed along the longitudinal axis of the member are connected so as to indicate any temperature difference for different sections of the member distributed along the longitudinal axis of the member.

Alternatively, the plurality of pairs of electrical temperature detectors distributed along the longitudinal axis of the member to detect any temperature difference in relation to an appropriate transverse direction across the member are connected in series, to provide an enhanced electrical signal representative of the relevant mean, along the longitudinal axis of the member, of the detected temperature differences.

In such an arrangement for the thermocouples it is advantageous that certain errors in the thermocouples cancel out, the cancellation being because the thermocouples measure changes of temperature differences, and not absolute temperatures. Otherwise in such an arrangement these thermocouple errors will be cumulative.

A selected member may have any conveniently provided shape in section.

The probe-bearing mechanism may have any form of construction.

The probe-bearing mechanism may not include a work table to support a work piece, and/or may not include a bridge.

Apparatus in accordance with the present invention may not have a probe-bearing mechanism, but may instead include any other form of mechanism suitable to make a desired measurement.

The apparatus, in accordance with the present invention, may comprise test apparatus.

In general, apparatus in accordance with the present invention may have any form including a mechanism, within which are to be performed movements, possibly including performing also measurements or tests, in relation to a plurality of axes associated with the mechanism. Such apparatus not also performing measurements or tests could comprise, say, a machine tool.

We claim:

1. Apparatus with a mechanism to perform movements in relation to a plurality of axes associated with the mechanism, comprising means to compute the extent and direction of each predetermined aspect of thermal distortion capable of occurring within the mechanism due to temperature differences transversely across each of a selected plurality of constituent members of the mechanism, said means including at least one pair of temperature detectors provided individually for each of the selected plurality of members, each pair of temperature detectors being arranged to sense differences in temperature in relation either to a direction transversal to an axis of the member or to one of two directions transversal to said axis and wherein said two directions are at an angle to each other.

2. Apparatus as claimed in claim 1, in which at least one of the selected members of the mechanism comprises a beam member.

3. Apparatus as claimed in claim 2, having a measuring or testing mechanism including a work table on which a work piece to be measured or tested is to be positioned, a bridge having a beam mounted at its ends on pillars and spanning the work table, the bridge being free to move relative to the work table, a probe carrier mounted on the bridge beam, and being free to move along the bridge beam and a probe tip at the end of a column, the column being supported by the probe carrier and being free to move along its longitudinal axis relative to the probe carrier, said plurality of selected members within the mechanism including one pillar for the bridge beam, the bridge beam, and the column having the probe tip at one end.

4. Apparatus as claimed in claim 1 in which the temperature detectors comprise electrical temperature detectors.

5. Apparatus as claimed in claim 1 in which there is a plurality of pairs of temperature detectors in relation to a transverse direction across at least one selected member, the plurality of pairs of temperature detectors being spaced from each other along the longitudinal axis of the member.

6. Apparatus as claimed in claim 5 in which the plurality of pairs of temperature detectors are connected in series.

7. Apparatus as claimed in claim 5 in which the arrangement is such that there is to be detected any temperature differences in relation to said transverse direction across the member, individually, for a plurality of constituent sections of the member, the sections being distributed along the longitudinal axis of the member.

8. Apparatus as claimed in claim 1 in which at least one of the selected members of the mechanism comprises a beam member having a hollow form of construction, and each associated pair of temperature detectors is positioned within the hollow beam member.

9. Apparatus as claimed in claim 8 wherein the temperature detectors are electrical and further include leads extending from the detectors along the longitudinal axis of the beam member to a point external of the beam member.

10. Apparatus as claimed in claim 1, in which at least one pair of temperature detectors, comprises electrical temperature detectors in the form of a pair of thermocouple junctions arranged back-to-back with a length of one thermocouple material extending between the two junctions and two leads of another thermocouple material extending individually from the two junctions.

11. Apparatus as claimed in claim 1 in which computed errors within the mechanism, comprising the extent and direction of each predetermined aspect of thermal distortion within the mechanism, or corresponding derived errors in movements calculated from the computed errors due to thermal distortion within the mechanism, are included within an active error map.

12. Apparatus as claimed in claim 11, in which computed errors within the mechanism, comprising the extent and direction of each of the predetermined aspects of thermal distortion within the mechanism, or corresponding derived errors in movements calculated from the computed errors due to thermal distortion within the mechanism, are superimposed on a geometric error map.

* * * * *